(12) United States Patent
Oikawa

(10) Patent No.: US 12,045,410 B2
(45) Date of Patent: Jul. 23, 2024

(54) CONDUCTIVE FILM, TOUCH SENSOR FILM, AND IMAGE DISPLAY APPARATUS

(71) Applicant: FUJIFILM Corporation, Tokyo (JP)

(72) Inventor: Tokuju Oikawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/355,163

(22) Filed: Jul. 19, 2023

(65) Prior Publication Data

US 2024/0077964 A1    Mar. 7, 2024

(30) Foreign Application Priority Data

Aug. 31, 2022  (JP) .................. 2022-137665

(51) Int. Cl.
  *G06F 3/041*  (2006.01)
  *G06F 3/044*  (2006.01)
(52) U.S. Cl.
  CPC .......... *G06F 3/0412* (2013.01); *G06F 3/0445* (2019.05); *G06F 3/0446* (2019.05); *G06F 2203/04112* (2013.01)
(58) Field of Classification Search
  None
  See application file for complete search history.

(56) References Cited

FOREIGN PATENT DOCUMENTS

JP    2015-022531 A    2/2015

OTHER PUBLICATIONS

English machines translation of Japanese patent publication 2015/022513 A1 (Year: 2015).*

* cited by examiner

*Primary Examiner* — Nicholas J Lee
(74) *Attorney, Agent, or Firm* — Edwards Neils LLC; Jean C. Edwards, Esq.

(57) ABSTRACT

Provided are a conductive film, a touch sensor film, and an image display apparatus, in which disconnection of a metal wire hardly occurs even when bending is repeated. The conductive film includes a base material, protruding parts disposed thereon, each of which projects in one direction and a plurality of which are spaced apart in a direction orthogonal to the one direction, and a metal wire that intersects the one direction and extends across the protruding parts, where a width of the protruding part in the direction orthogonal to the one direction is denoted as $Lj$, and an interval between the protruding parts is denoted as $Ld$, $1~\mu m \leq Lj < 100~\mu m$ and $1~\mu m \leq Ld < 100~\mu m$, and when a thickness of the metal wire is denoted as $td$, and a thickness of the protruding part is denoted as $tj$, $tj \geq td$, are satisfied.

12 Claims, 6 Drawing Sheets

CONDUCTIVE FILM, TOUCH SENSOR FILM, AND IMAGE DISPLAY APPARATUS

CROSS-REFERENCE TO RELATED APPLICATIONS

The present application claims priority under 35 U.S.C. § 119 to Japanese Patent Application No. 2022-137665, filed on Aug. 31, 2022. The above application is hereby expressly incorporated by reference, in its entirety, into the present application.

BACKGROUND OF THE INVENTION

1. Field of the Invention

The present invention relates to a conductive film having a metal wire, a touch sensor film, and an image display apparatus.

2. Description of the Related Art

Among various electronic apparatuses including portable information apparatus such as a tablet computer and a smartphone, there is a touch panel which is used in combination with a display device such as a liquid crystal display device and with which an input operation to an electronic apparatus is carried out by touching a screen or bringing a finger, a stylus pen, or the like close to a screen.

In the touch panel, a conductive film on which a plurality of detection electrodes and the like for detecting a touch operation with a finger, a stylus pen, or the like is formed is generally used as the touch sensor. The detection electrode of the conductive film is formed from a transparent conductive oxide such as indium tin oxide (ITO), a metal, or the like. As compared with a transparent conductive oxide, a metal has advantages such as easy patterning, excellent flexibility, and a lower electric resistance value. For this reason, in the conductive film, a metal such as copper or silver is used in a metal wire that constitutes a detection electrode, a lead-out wiring line, and the like.

For example, JP2015-22531A discloses an electrode sheet having flexibility, including a base material film having flexibility, a plurality of transparent electrodes formed of a transparent conductive material having flexibility, on a first surface of the base film, and a plurality of routing wiring lines formed of a metal paste in a periphery of a region in which the plurality of transparent electrodes are formed, the plurality of routing wiring lines being electrically connected to each of the plurality of transparent electrodes, where a portion of the routing wiring line, the portion being formed along a first direction, is formed to be closely attached to a wavy surface on which peaks and valleys are repeated and which projects along a second direction that intersects the first direction.

SUMMARY OF THE INVENTION

In a case where the electrode sheet of JP2015-22531A is used in a touch panel, a part of the electrode sheet may be bent. In this case, disconnection of a metal wire easily occurs, and thus an improvement is required with respect to this disconnection. As described above, it is required that a metal wire is not disconnected even in a case where the metal wire is repeatedly bent.

An object of the present invention is to provide a conductive film, a touch sensor film, and an image display apparatus, in which disconnection of a metal wire hardly occurs even in a case where bending is repeated.

The above-described objects can be achieved by the following configurations.

An invention [1] is a conductive film comprising:
a base material;
protruding parts disposed on the base material, each of which projects in one direction and a plurality of which are spaced apart to be disposed in a direction orthogonal to the one direction; and
a metal wire that intersects the one direction and extends across the plurality of protruding parts,
in which in a case where a width of the protruding part in the direction orthogonal to the one direction in which the protruding part projects is denoted as Lj, and an interval between the plurality of protruding parts is denoted as Ld, $1\ \mu m \le Lj < 100\ \mu m$ and $1\ \mu m \le Ld < 100\ \mu m$ are satisfied, and
in a case where a thickness of the metal wire is denoted as td, and a thickness of the protruding part is denoted as tj, $tj \ge td$ is satisfied.

An invention [2] is the conductive film according to the invention [1], in which the thickness td of the metal wire and the thickness tj of the protruding part satisfy $tj \ge 2td$.

An invention [3] is the conductive film according to the invention [1] or [2], in which the interval Ld between the protruding parts satisfies $1\ \mu m \le Ld \le 20\ \mu m$.

An invention [4] is the conductive film according to any one of the inventions [1] to [3], in which the width Lj of the protruding part in the direction orthogonal to the one direction in which the protruding part projects satisfies $1\ \mu m \le Lj \le 20\ \mu m$.

An invention [5] is a touch sensor film comprising the conductive film according to any one of the inventions [1] to [4].

An invention [6] is an image display apparatus comprising the conductive film according to any one of the inventions [1] to [4].

According to the present invention, it is possible to provide a conductive film, a touch sensor film, and an image display apparatus, in which disconnection of a metal wire hardly occurs.

DESCRIPTION OF THE PREFERRED EMBODIMENTS

Hereinafter, a conductive film, a touch sensor film, and an image display apparatus, according to the embodiments of the present invention, will be described in detail based on suitable embodiments illustrated in the attached drawings.

The figures described below are exemplary for explaining the present invention, and the present invention is not limited to the figures illustrated below.

In the following, "to" indicating a numerical range includes numerical values described on both sides thereof. For example, in a case where c is a numerical value $\varepsilon_\alpha$ to a numerical value $\varepsilon_\beta$, the range of $\varepsilon$ is a range including the numerical value $\varepsilon_\alpha$ and the numerical value $\varepsilon_\beta$, and thus it is $\varepsilon_\alpha \le \varepsilon \le \varepsilon_\beta$ in a case of describing with mathematical symbols.

Angles described as, for example, "an angle represented by a specific numerical value", "parallel", "vertical", and "orthogonal" include error ranges generally tolerated in the art, unless otherwise described.

Image Display Apparatus

Figure 1:
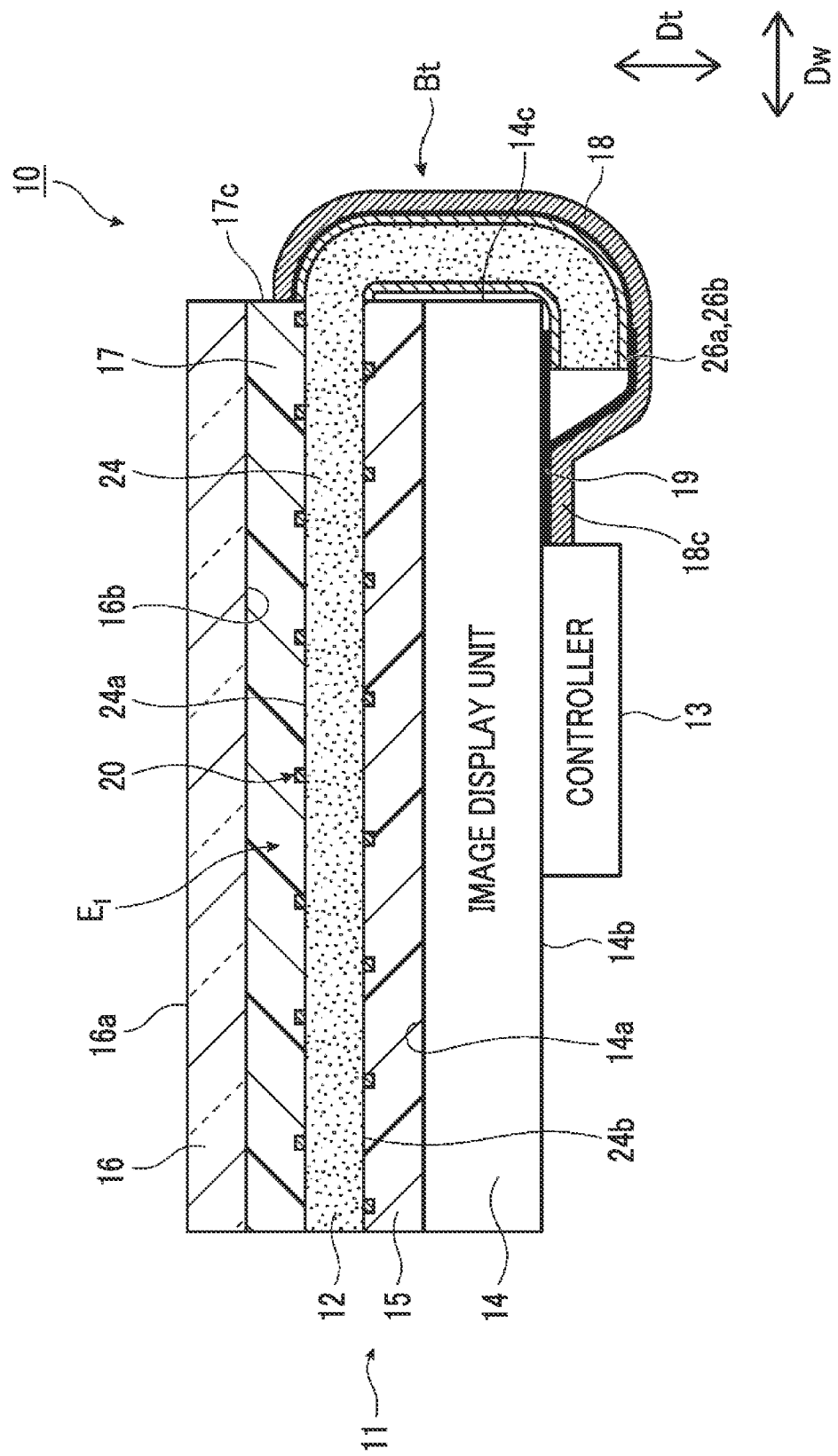
FIG. 1 is a schematic cross-sectional view illustrating an example of an image display apparatus according to the embodiment of the present invention.

FIG. 1 is a schematic cross-sectional view illustrating an example of an image display apparatus according to the embodiment of the present invention.

An image display apparatus 10 illustrated in FIG. 1 has a conductive film 12, an image display unit 14, a cover part 16, a first transparent insulation layer 15, and a second transparent insulation layer 17. In the image display apparatus 10, the image display unit 14, the first transparent insulation layer 15, the conductive film 12, the second transparent insulation layer 17, and the cover part 16 are laminated in this order in a lamination direction Dt, and the conductive film 12 is disposed on a side of a display surface 14a of the image display unit 14. For example, a touch panel 11 is composed of the conductive film 12, a controller 13, the second transparent insulation layer 17, and the cover part 16.

In the image display apparatus 10, the conductive film 12 and the image display unit 14 are laminated with the first transparent insulation layer 15 being interposed therebetween. The conductive film 12 and the cover part 16 are laminated with the second transparent insulation layer 17 being interposed therebetween.

A first transparent insulation layer 15 is provided on an entire region of the display surface 14a of the image display unit 14. For example, the first transparent insulation layer 15 and the second transparent insulation layer 17 are provided in the same region. Therefore, in a case of being viewed from a side of a surface 16a of the cover part 16, the first transparent insulation layer 15 and the second transparent insulation layer 17 have the same size.

In the image display apparatus 10, it is preferable that the first transparent insulation layer 15 disposed on the side of the display surface 14a of the image display unit 14 the conductive film 12, the second transparent insulation layer 17, and the cover part 16 are all transparent so that a display object (not illustrated in the drawing) displayed on the display surface 14a of the image display unit 14 can be visible.

In the image display apparatus 10, the surface 16a of the cover part 16 is a touch surface of the image display apparatus 10 and serves as an operation surface. The image display apparatus 10 is subjected to an input operation using the surface 16a of the cover part 16 as an operation surface. It is noted that the touch surface is a surface that detects contact with a finger, a stylus pen, or the like. The surface 16a of the cover part 16 serves as a visible surface of a display object (not illustrated in the drawing) displayed on the display surface 14a of the image display unit 14.

A controller 13 is provided on a back surface 14b of the image display unit 14. The conductive film 12 is bent to surround a side surface 14c of the image display unit 14, whereby a first external connection terminal 26a and a second external connection terminal 26b are disposed on a side of the back surface 14b of the image display unit 14. The first external connection terminal 26a and the second external connection terminal 26b of the conductive film 12 and the controller 13 are electrically connected by, for example, a wiring member having flexibility such as a flexible circuit board 19.

As will be described in detail later, the conductive film 12 has a bendable bending part Bt that protrudes from the first transparent insulation layer 15 and the second transparent insulation layer 17, where the side surface 17c of the second transparent insulation layer 17 in a direction Dw orthogonal to the lamination direction Dt, and the bending part Bt of the conductive film 12 are covered by a protective film 18.

In addition, it is preferable that a terminal 18c of the protective film 18 is in contact with the cover part 16 and a surface on a side opposite to the display surface 14a of the image display unit 14, that is, in contact with the back surface 14b. This makes it possible to further suppress the sulfidation of the conductive layer by the protective film 18. The protective film 18 covers the flexible circuit board 19 and is provided to be in contact with the back surface 14b of the image display unit 14.

The controller 13 is composed of a known controller that is used for the detection in the touch sensor. In a case where the image display apparatus 10 belongs to the capacitance type, the controller 13 detects a position where the capacitance is changed by contact with a finger or the like on the surface 16a of the cover part 16 which serves as a touch surface. Although the capacitance type touch panel includes a mutual capacitance type touch panel and a self-capacitance type touch panel, it is not particularly limited.

The cover part 16 is a cover part that protects the conductive film 12. The configuration of the cover part 16 is not particularly limited. The cover part 16 is preferably transparent so that a display object (not illustrated in the drawing) displayed on the display surface 14a of the image display unit 14 can be visible. For the cover part 16, for example, a plastic film, a plastic plate, a glass plate, or the like is used. It is preferable that the thickness of the cover part 16 is appropriately selected according to each use application.

As raw materials of the above-described plastic film and plastic plate, the following materials can be used, for example, polyesters such as polyethylene terephthalate (PET) and polyethylene naphthalate (PEN); polyolefins such as polyethylene (PE), polypropylene (PP), polystyrene, and vinyl acetate copolymerized polyethylene (EVA); vinyl resins; and other materials such as a polycarbonate (PC), polyamide, polyimide, an acrylic resin, triacetyl cellulose (TAC), a cycloolefin-based resin (COP), polyvinylidene fluoride (PVDF), polyarylate (PAR), polyether sulfone (PES), a polymeric acrylic resin, a fluorene derivative, and crystalline COP.

In addition, as the cover part 16, a polarizing plate, a circularly polarizing plate, or the like may be used.

Since the surface 16a of the cover part 16 serves as a touch surface as described above, a hard coat layer may be provided on the surface 16a as necessary. The thickness of the cover part 16 is, for example, 0.1 to 1.3 mm, and it is particularly preferably 0.1 to 0.7 mm.

The configuration of the first transparent insulation layer 15 is not particularly limited as long as it is transparent and has electrical insulating properties, and it can stably fix the conductive film 12 and the image display unit 14. As the first transparent insulation layer 15, it is possible to use, for example, an optical clear resin (OCR) such as an optical clear adhesive (OCA) or an ultra violet (UV) curing resin. In addition, the first transparent insulation layer 15 may be partially hollow.

In addition, the configuration of the second transparent insulation layer 17 is not particularly limited as long as it is denoted as transparent and has electrical insulating properties, and it can stably fix the conductive film 12 and the cover part 16. As the second transparent insulation layer 17, the same one as the first transparent insulation layer 15 can be used.

The image display unit 14 is an image display unit that includes the display surface 14a for displaying a display object such as an image, and it is, for example, a liquid crystal display device. The image display unit 14 is not limited to the liquid crystal display device, and it may be an organic electro luminescence (organic EL) display device. In addition to the display device described above, it is possible to use, as the image display unit 14, a cathode ray tube (CRT) display device, a vacuum fluorescent display (VFD), a plasma display panel (PDP), a surface electric field display (SED), an electric field emission display (FED), and an electron paper, or the like.

An image display unit in response to the use application of the image display unit 14 can be appropriately used. However, it is preferable that the image display unit 14 has a form of a panel such as a liquid crystal display panel or an organic EL panel so that the thickness of the image display apparatus 10 is configured to be thin.

Conductive Film

Figure 2:
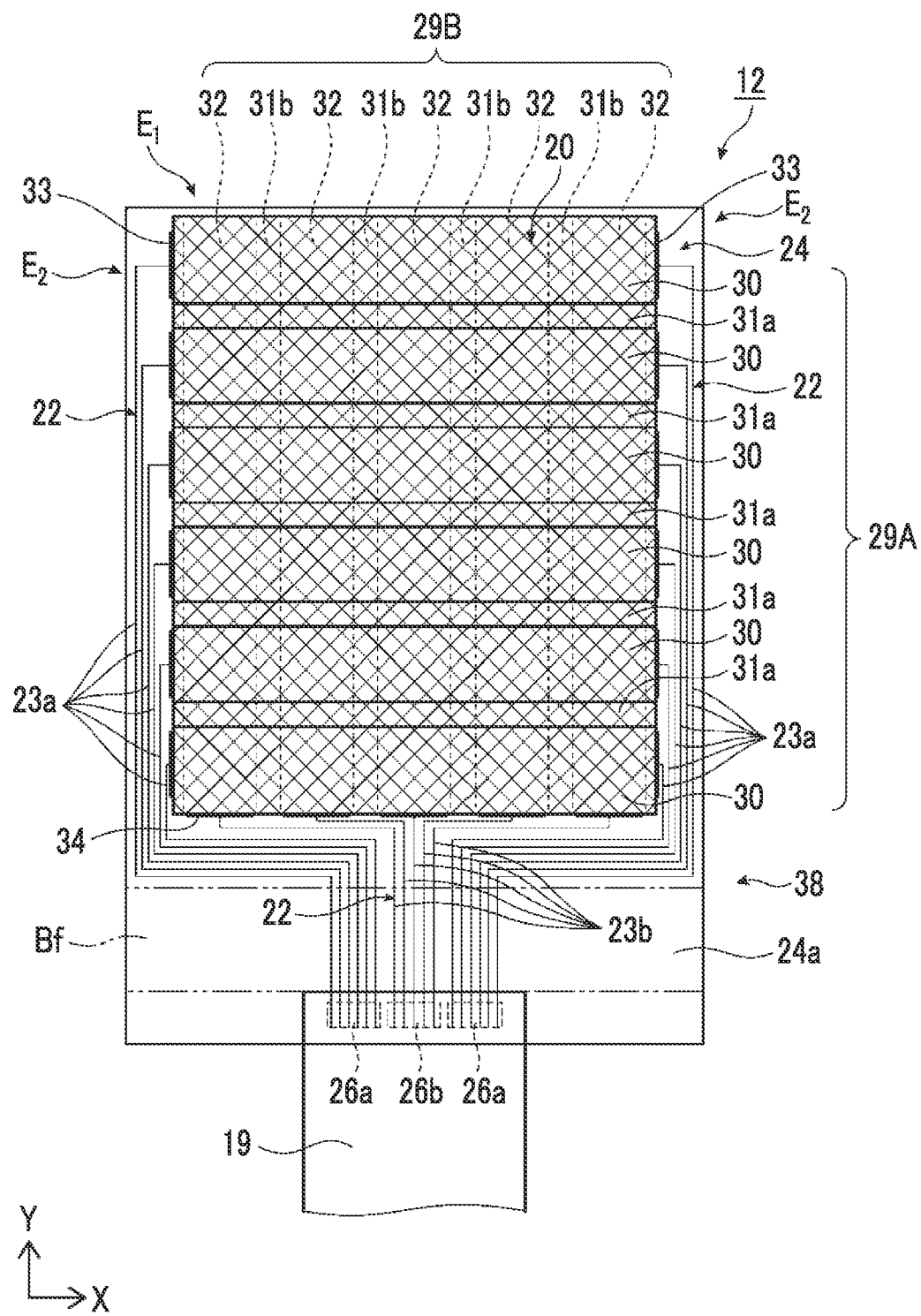
FIG. 2 is a schematic view illustrating an example of a touch sensor film having a conductive film according to the embodiment of the present invention.
Figure 3:
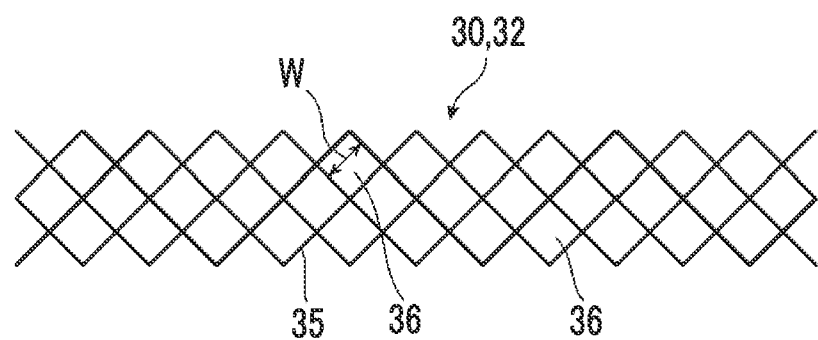
FIG. 3 is a schematic view illustrating an example of an electrode configuration of a detection unit of the conductive film according to the embodiment of the present invention.

The conductive film 12 will be described with reference to FIG. 2. FIG. 2 is a schematic view illustrating an example of a touch sensor film having a conductive film according to the embodiment of the present invention, and FIG. 3 is a schematic view illustrating an example of an electrode configuration of a detection unit of the conductive film according to the embodiment of the present invention. It is noted that in FIG. 2 and FIG. 3, the same reference numerals are assigned to the same configuration components as those in the image display apparatus 10 illustrated in FIG. 1, and the detailed description thereof will be omitted.

The conductive film 12 illustrated in FIG. 2 is a portion that functions as a touch sensor of the touch panel 11 (see FIG. 1), and it has a detection unit 20 that is a detection region $E_1$ where a user can carry out an input operation, and a peripheral wiring part 22 in a peripheral region $E_2$ that is located on the outside of the detection region $E_1$.

The detection unit 20 has, for example, a first detection electrode layer 29A and a second detection electrode layer 29B. The first detection electrode layer 29A and the second detection electrode layer 29B are disposed, for example, with a base material 24 being sandwiched therebetween. The first detection electrode layer 29A and the second detection electrode layer 29B are electrically insulated by the base material 24. The base material 24 functions as an electrical insulating layer.

The first detection electrode layer 29A has a plurality of the first detection electrodes 30 and a plurality of first dummy electrodes 31a that are disposed between the adjacent first detection electrodes 30 and insulated from the first detection electrodes 30.

The plurality of first detection electrodes 30 are strip-shaped electrodes that extend in the X direction in parallel with each other and are provided on the surface 24a of the base material 24 (see FIG. 1) in a state of being spaced apart from each other in the Y direction orthogonal to the X direction and being electrically insulated from each other in the Y direction. In addition, the plurality of first dummy electrodes 31a are disposed between the first detection electrodes 30 and are provided on the surface 24a of the base material 24 (see FIG. 1) in a state of being electrically insulated from the first detection electrodes 30. A first electrode terminal 33 is provided at least one end of each of the first detection electrodes 30 in the X direction.

The second detection electrode layer 29B has a plurality of second detection electrodes 32 and a plurality of second dummy electrodes 31b that are disposed between the adjacent second detection electrodes 32 and insulated from the second detection electrodes 32. The plurality of second detection electrodes 32 are strip-shaped electrodes that extend in the Y direction in parallel with each other and are provided on the back surface 24b of the base material 24 (see FIG. 1) in a state of being spaced apart from each other in the X direction and being electrically insulated from each other in the X direction. In addition, the plurality of second dummy electrodes 31b are disposed between the second detection electrodes 32 and are provided on the back surface 24b of the base material 24 (see FIG. 1) in a state of being electrically insulated from the second detection electrodes 32. A second electrode terminal 34 is provided at one end of each of the second detection electrodes 32 in the Y direction.

The plurality of first detection electrodes 30 and the plurality of second detection electrodes 32 are provided orthogonally to each other; however, they are electrically insulated from each other by the base material 24 as described above.

The first dummy electrode 31a and the second dummy electrode 31b in the first detection electrode 30 and the second detection electrode 32 are separated from the first detection electrode 30 or the second detection electrode 32 by a disconnection portion, and they are regions which are not electrically connected. As a result, as described above, the plurality of first detection electrodes 30 are in a state of being electrically insulated from each other in the Y direction, and the plurality of second detection electrodes 32 are in a state of being electrically insulated from each other in the X direction. As illustrated in FIG. 2, six first detection electrodes 30 and five second detection electrodes 32 are provided in the detection unit 20; however, the numbers thereof are not particularly limited as long as they are plural.

The first detection electrode layer 29A and the second detection electrode layer 29B are formed from a metal wire 35. In a case where the first detection electrode 30 and the second detection electrode 32 are a metal mesh having a mesh pattern formed by the metal wire 35, the first dummy electrode 31a and the second dummy electrodes 31b are also a metal mesh having a mesh pattern formed by the metal wire 35.

The electrode width of the first detection electrode 30 and the electrode width of the second detection electrode 32 are, for example, 1 to 5 mm, and the pitch between the electrodes is 3 to 6 mm. The electrode width of the first detection electrode 30 is denoted as the maximum length in the Y direction, and the electrode width of the second detection electrode 32 is denoted as the maximum length in the X direction.

The peripheral wiring part 22 is a region where peripheral wires (a first peripheral wire 23a and a second peripheral wire 23b) that are wiring lines for transmitting or transferring a touch drive signal and a touch detection signal from a controller 13 (see FIG. 1) to the first detection electrode 30 and the second detection electrode 32 are disposed. The peripheral wiring part 22 has a plurality of first peripheral wires 23a and a plurality of second peripheral wires 23b. One end of the first peripheral wire 23a is electrically connected to the first detection electrode 30 through the first electrode terminal 33, and the other end thereof is electrically connected to a first external connection terminal 26a. Further, one end of the second peripheral wire 23b is electrically connected to the second detection electrode 32 through the second electrode terminal 34, and the other end thereof is electrically connected to a second external connection terminal 26b.

The flexible circuit board 19 is electrically connected to the first external connection terminal 26a and the second external connection terminal 26b of the conductive film 12. The touch sensor film 38 is composed of the conductive film 12 and a flexible circuit board 19.

The first peripheral wire 23a and the second peripheral wire 23b can also have the same configuration as the first detection electrode 30 and the second detection electrode 32 and are composed of the metal wire 35.

The first electrode terminal 33 and the second electrode terminal 34 may have a fill pattern shape or a mesh shape as shown in JP2013-127658A. The preferred range of the widths of the first electrode terminal 33 and the second electrode terminal 34 is ⅓ times or more and 1.2 times or less with respect to each of the electrode widths of the first detection electrode 30 and the second detection electrode 32.

The first detection electrode 30, the first dummy electrode 31a, the first electrode terminal 33, and the first peripheral wire 23a of the first detection electrode layer 29A are preferably integrally constituted and still more preferably formed of the same metal material from the viewpoints of the electric resistance and the hardness in the occurrence of disconnection.

Similarly, the second detection electrode 32, the second dummy electrode 31b, the second electrode terminal 34, and the second peripheral wire 23b of the second detection electrode layer 29B are preferably integrally constituted and still more preferably formed of the same metal material from the viewpoints of the electric resistance and the hardness in the occurrence of disconnection.

In addition, the first detection electrode 30 and the first dummy electrode 31a of the first detection electrode layer 29A are composed of, for example, the metal wire 35 in a mesh pattern (see FIG. 3).

The second detection electrode 32 and the second dummy electrode 31b of the second detection electrode layer 29B are composed of, for example, the metal wire 35 in a mesh pattern (see FIG. 3).

The conductive film 12 is bent in a bending region Bf of the peripheral wiring part 22 illustrated in FIG. 2 with the surface 24a of the base material 24 being on the outside.
Metal Wire FIG. 4 is a schematic cross-sectional view illustrating an example of a metal wire of the conductive film according to the embodiment of the present invention, FIG. 5 is a schematic plan view illustrating an example of a metal wire of the conductive film according to the embodiment of the present invention, and FIG. 6 is a schematic cross-sectional view illustrating a state where a metal wire of the conductive film according to the embodiment of the present invention is bent.

Figure 4:
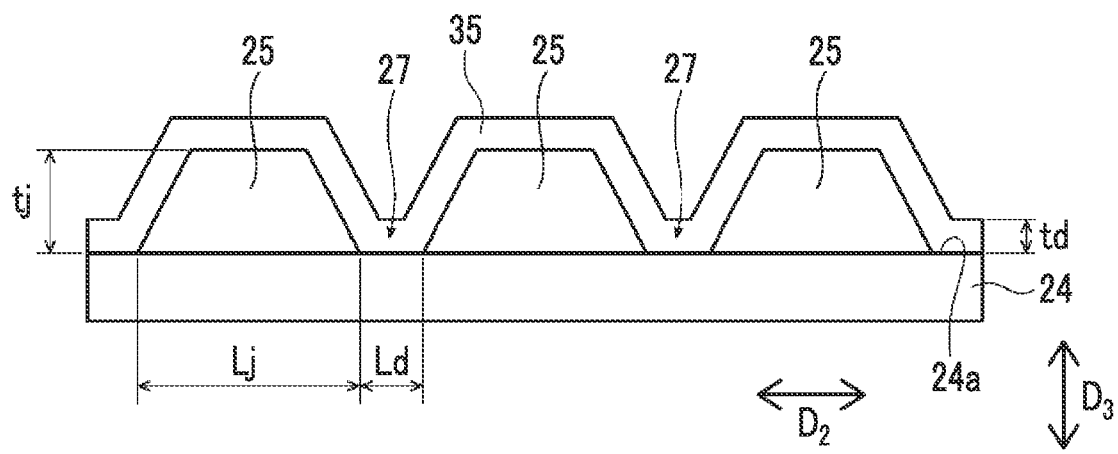
FIG. 4 is a schematic cross-sectional view illustrating an example of a metal wire of the conductive film according to the embodiment of the present invention.
Figure 5:
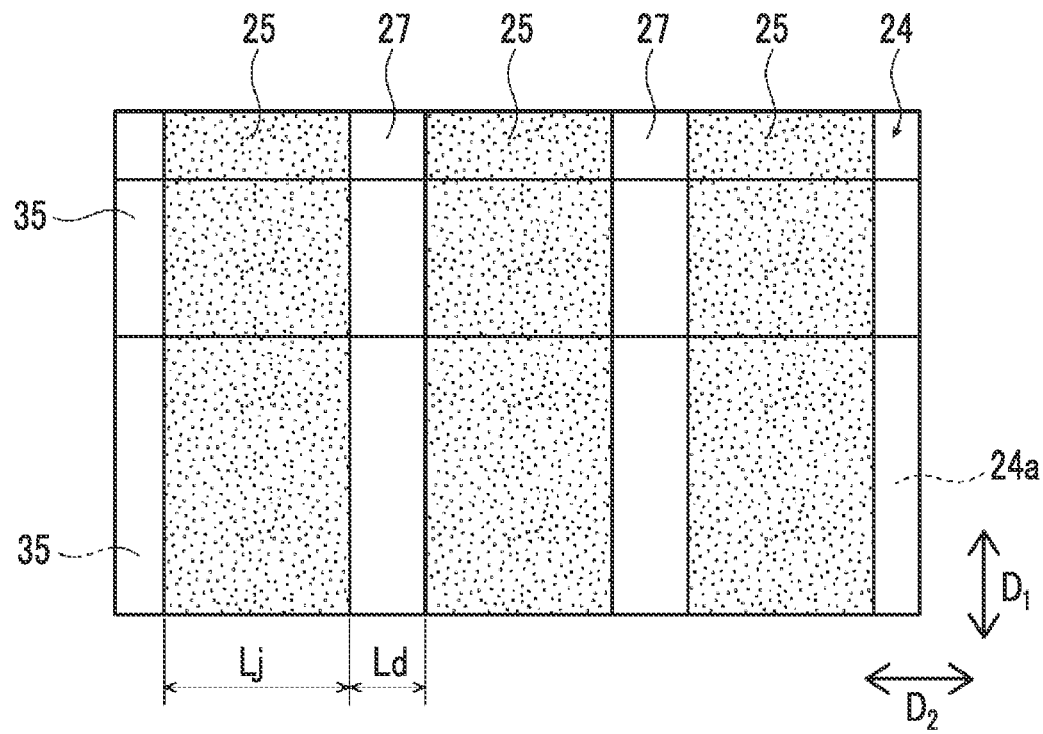
FIG. 5 is a schematic plan view illustrating an example of a metal wire of the conductive film according to the embodiment of the present invention.
Figure 6:
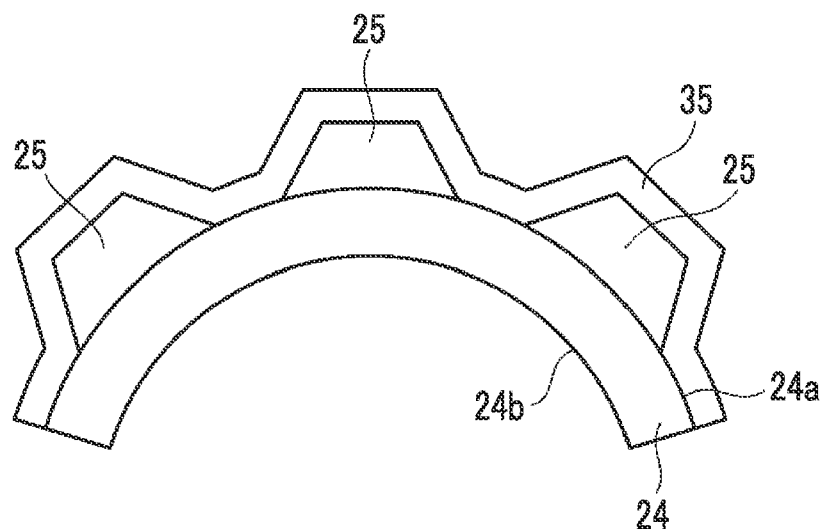
FIG. 6 is a schematic cross-sectional view illustrating a state where a metal wire of the conductive film according to the embodiment of the present invention is bent.

It is noted that in FIG. 4 to FIG. 6, the same reference numerals are assigned to the same configuration components as those in the image display apparatus 10 illustrated in FIG. 1, and the detailed description thereof will be omitted.

In the above-described conductive film 12, protruding parts 25 disposed on the base material 24, each of which projects in one direction $D_1$ (see FIG. 5) and a plurality of which are spaced apart to be disposed in a direction $D_2$ orthogonal to the one direction $D_1$, are disposed. The metal wire 35, which intersects the one direction $D_1$ and extends across the plurality of protruding parts 25, is provided.

As illustrated in FIG. 5, the protruding part 25 is a strip-shaped member that projects in the one direction $D_1$. The one direction $D_1$ is a direction in which the protruding part 25 projects.

It is noted that the one direction $D_1$ is the first direction, and the orthogonal direction $D_2$ is the second direction. In addition, the direction $D_3$ perpendicular to the surface 24a of the base material 24, which will be described later, is the third direction.

As illustrated in FIG. 4 and FIG. 5, the surface 24a of the base material 24 is exposed in a space 27 between the protruding parts 25. In the space 27 between the protruding parts 25, the metal wire 35 is disposed in contact with the surface 24a of the base material 24.

The cross-sectional shape of the protruding part 25 illustrated in FIG. 4 is, for example, a trapezoidal shape in which the lower base is longer than the upper base on the side of the surface 24a of the base material 24, which is not limited thereto. The cross-sectional shape of the protruding part 25 illustrated in FIG. 4 may be a trapezoidal shape or a quadrangular shape, in which the length of the upper base and the length of the lower base are equal to each other. Although the side surface of the protruding part 25 illustrated in FIG. 4 has a slope, the contour of the slope is not limited to the straight line in the cross section illustrated in FIG. 4, and it may be a curved line.

In a case where a width of the protruding part 25 in the direction $D_2$ orthogonal to the one direction $D_1$ in which the protruding part 25 projects is denoted as Lj (see FIG. 4 and FIG. 5), and an interval between the plurality of protruding parts 25 is denoted as Ld (see FIG. 4 and FIG. 5), 1 µm≤Lj<100 µm and 1 µm≤Ld<100 µm are satisfied.

In a case where a thickness of the metal wire 35 is denoted as td, and a thickness of the protruding part 25 is denoted as tj, tj≥td is satisfied.

With the above-described configuration, for example, in a case where the base material 24 is bent so that the back surfaces 24b of the base material 24 are close to each other as illustrated in FIG. 6, the stress acting on the metal wire 35 is relaxed by the protruding part 25, and thus the occurrence of cracking in the metal wire 35 is suppressed. This makes the disconnection in the metal wire 35 difficult to occur, whereby conductive connection can be ensured. Therefore, it is possible to obtain the conductive film 12, in which the disconnection of the metal wire 35 hardly occurs, even in a case where the metal wire 35 is repeatedly bent.

Since the width Lj of the protruding part 25 is 1 µm≤Lj<100 µm, and the interval Ld between the protruding parts 25 is 1 µm≤Ld<100 µm, the relaxation effect is exhibited in a case where deformation occurs. On the other hand, in a case where the width Lj of the protruding parts 25 exceeds 100 µm, and the interval Ld between the protruding parts 25 exceeds 100 µm, stress is concentrated on a part of the metal wire 35, and the relaxation effect cannot be expected.

Since the relaxation effect is further exhibited in a case where deformation occurs, the width Lj of the protruding parts 25 is preferably 1 µm≤Lj<20 µm, and the interval Ld between the protruding parts 25 is preferably 1 µm≤Ld<20 µm.

It is noted that the width Lj of the protruding part 25 and the interval Ld between the protruding parts 25 preferably have the same length. However, the interval Ld between the protruding parts 25 may be longer, or conversely, the interval Ld between the protruding parts 25 may be shorter than the width Lj of the protruding parts 25.

Since the thickness td of the metal wire 35 and the thickness tj of the protruding part 25 satisfy tj≥td, the thickness td of the metal wire 35 is not large as compared with the thickness tj of the protruding part 25, the space between the adjacent protruding parts 25 is filled with the metal wire 35 to prevent becoming flattened, and thus the metal wire 35 is configured to have an uneven shape reflecting the protruding part 25. Accordingly, in a case where the base material 24 is deformed as illustrated in FIG. 6, the metal wire 35 has a gap between the protruding parts 25, and the occurrence of cracking in the metal wire 35 is suppressed.

It is preferable that the thickness td of the metal wire 35 and the thickness tj of the protruding part 25 satisfy tj≥2td since the occurrence of cracking in the metal wire 35 can be further suppressed. In a case of tj≥2td, the surface of the metal wire 35 is further unflattened.

The thickness td of the metal wire 35 is preferably 200 to 800 nm from the viewpoint that the effect of the present invention and the conductivity of the conductive film are excellent in a well-balanced manner. The thickness tj of the protruding part 25 is preferably 1,000 to 2,000 nm.

In FIG. 5, the metal wire 35 is disposed in parallel with the direction Dz; however, the disposition thereof is not limited thereto. For example, the metal wire 35 may be disposed to be inclined with respect to the direction $D_2$. The direction of inclination is not particularly limited. In addition, the metal wire 35 illustrated in FIG. 4 may have a mesh patterned shape as illustrated in FIG. 3.

As illustrated in FIG. 4, for the width Lj of the protruding part 25, a cross-sectional image of the protruding part 25 and the metal wire 35 is acquired. In the cross-sectional image, ten positions corresponding to the width Lj of the protruding part 25 are selected. The lengths of the selected positions in the direction $D_2$ are measured, and the average value of the lengths of the ten positions is denoted as the width Lj of the protruding part 25.

In addition, regarding the interval Ld between the protruding parts 25, ten positions corresponding to the interval Ld between the protruding parts 25 are selected in the above-described cross-sectional image. The lengths of the selected positions in the direction $D_2$ are measured, and the average value of the lengths of the ten positions is denoted as the interval Ld between the protruding parts 25.

In addition, regarding the thickness td of the metal wire 35, ten positions corresponding to the thickness td of the metal wire 35 are selected in the above-described cross-sectional image. The lengths of the selected positions in the direction $D_3$ perpendicular to the surface 24a of the base material 24, that is, in a direction perpendicular to both the one direction $D_1$ and the direction $D_2$, are measured, and the average value of the lengths of the ten positions is denoted as the thickness td of the metal wire 35.

Regarding the thickness tj of the protruding part 25, ten positions corresponding to the thickness tj of the protruding part 25 are selected in the above-described cross-sectional image. The lengths of the selected positions in the direction $D_3$ perpendicular to the surface 24a of the base material 24 are measured, and the average value of the lengths of the ten positions is denoted as the thickness tj of the protruding part 25.

Figure 7:
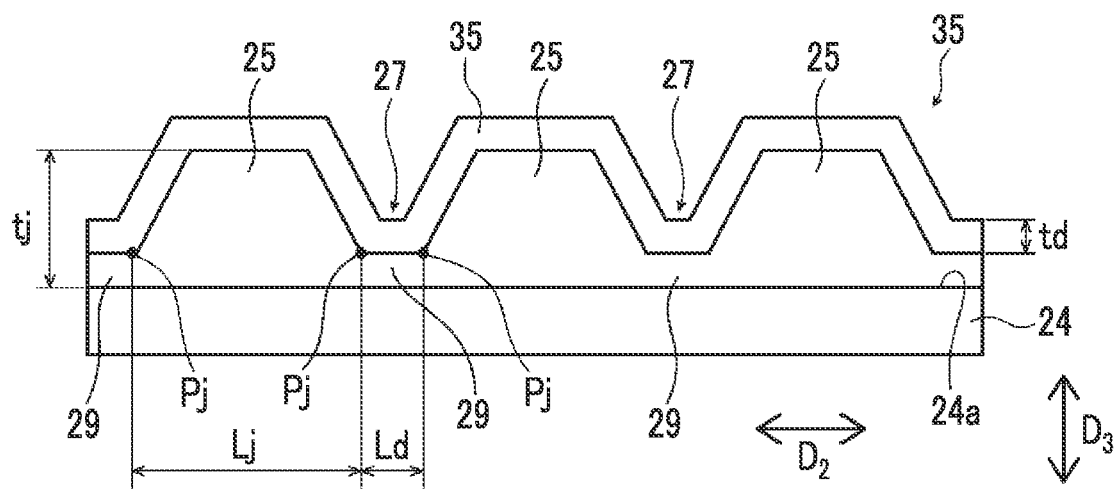
FIG. 7 is a schematic cross-sectional view illustrating another example of a metal wire of the conductive film according to the embodiment of the present invention.
Figure 8:
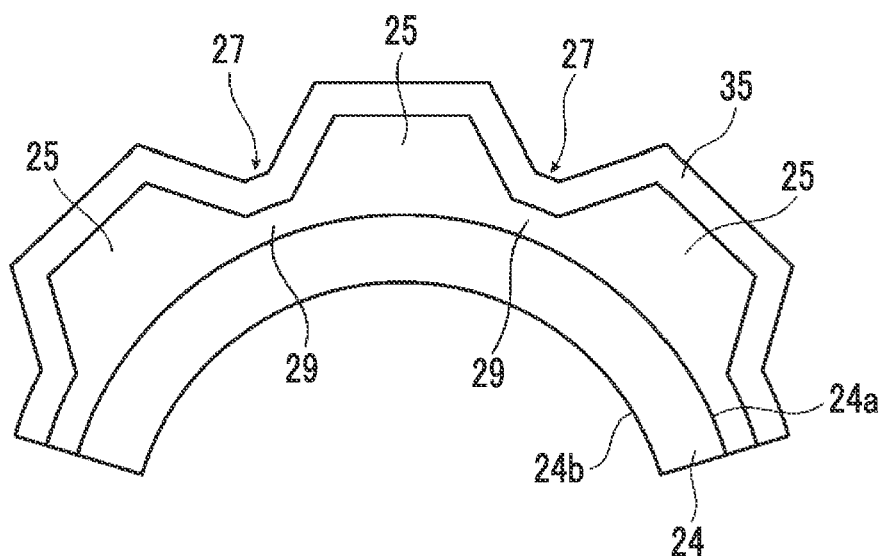
FIG. 8 is a schematic cross-sectional view illustrating a state where a metal wire of the conductive film according to the embodiment of the present invention is bent.

FIG. 7 is a schematic cross-sectional view illustrating another example of a metal wire of the conductive film according to the embodiment of the present invention, and FIG. 8 is a schematic cross-sectional view illustrating a state where a metal wire of the conductive film according to the embodiment of the present invention is bent. It is noted that in FIG. 7 and FIG. 8, the same reference numerals are assigned to the same configuration components as those in the configuration illustrated in FIG. 4 and FIG. 5, and the detailed description thereof will be omitted.

In the conductive film, the configuration of the protruding part 25 is not limited to those illustrated in FIG. 4 and FIG. 5. For example, as illustrated in FIG. 7, a configuration, in which the surface 24a of the base material 24 in the space 27 between the protruding parts 25 is not exposed, may be good. In FIG. 7, the adjacent protruding parts 25 are connected by a connecting portion 29 provided in the space 27. The metal wire 35 is provided on the protruding part 25 and the connecting portion 29.

In the configuration illustrated in FIG. 7, the thickness td of the metal wire 35 and the thickness tj of the protruding part 25 are respectively the same as the thickness td of the metal wire 35 and the thickness tj of the protruding part 25 of FIG. 4 described above.

In a case where the intersection between the protruding part 25 and the connecting portion 29 is denoted as Pj, the width Lj of the protruding part 25 is a length of the direction $D_2$ between the intersections Pj between which the protruding part 25 is sandwiched.

The interval Ld between the protruding parts 25 is a length of the connecting portion 29 in the direction $D_2$ and is a length of the direction $D_2$ between the intersections Pj between which the protruding part 25 is not sandwiched.

As illustrated in FIG. 7, a cross-sectional image of the protruding part 25 and the metal wire 35 is acquired. In the cross-sectional image, ten positions corresponding to the width Lj of the protruding part 25 are selected, where the ten positions are those between the intersections Pj between which the protruding part 25 is sandwiched. The lengths of the selected positions in the direction $D_2$ are measured, and the average value of the lengths of the ten positions is denoted as the width Lj of the protruding part 25.

In addition, in the above-described cross-sectional image, ten positions corresponding to the interval Ld of the protruding part 25 are selected between the intersections Pj between which the protruding part 25 is not sandwiched. The lengths of the selected positions in the direction $D_2$ are measured, and the average value of the lengths of the ten positions is denoted as the interval Ld between the protruding parts 25.

Even in a configuration in which the connecting portion 29 is provided in the space 27 between the protruding parts 25 illustrated in FIG. 7, the stress acting on the metal wire 35 is relaxed by the protruding part 25, and thus the occurrence of cracking in the metal wire 35 is suppressed, for example, in a case where the back surfaces 24b of the base material 24 are bent to be close to each other, as illustrated in FIG. 8. This makes the disconnection in the metal wire 35 difficult to occur, whereby conductive connection can be ensured. Therefore, it is possible to obtain the conductive film 12, in which the disconnection of the metal wire 35 hardly occurs, even in a case where the metal wire 35 is repeatedly bent.

It is noted that although a description has been made using an example in which the protruding part 25, or the protruding part 25 and the connecting portion 29 are provided on the surface 24a of the base material, where the example is not limited to this, and thus the protruding part 25, or the protruding part 25 and the connecting portion 29 can also be provided on the back surface 24b of the base material 24. In addition, the protruding part 25, or the protruding part 25 and the connecting portion 29 can also be provided on both surfaces of the base material 24. In a case being formed on both surfaces of the base material 24, the protruding part 25, or the protruding part 25 and the connecting portion 29 are formed on the surface 24a and the back surface 24b of the base material 24, separately or at the same time.

In addition, the protruding part 25, or the protruding part 25 and the connecting portion 29 can be provided on the surface 24a, back surface 24b, or both surfaces of the base material 24; however, the range in which the protruding part 25, or the protruding part 25 and the connecting portion 29 are provided is not particularly limited, and the protruding part 25, or the protruding part 25 and the connecting portion 29 may be provided on the entire surface of the surface 24a of the base material 24 or the entire surface of the back surface 24b of the base material 24. In a case where the base material 24 is bent as described above, the stress acting on the metal wire 35 is relaxed by the protruding part 25, whereby the disconnection of the metal wire 35 is suppressed, and thus it is preferable that the protruding part 25, or the protruding part 25 and the connecting portion 29 are provided at a place where the base material 24 is bent. For example, it is preferable that the protruding part 25, or the protruding part 25 and the connecting portion 29 are provided in a region of the base material 24, which corresponds to the bending region Bf of the peripheral wiring part 22 illustrated in FIG. 2.

Needless to say, in the base material 24, the metal wire 35 may be provided in a place where the protruding part 25, or the protruding part 25 and the connecting portion 29 are not provided. For example, the first detection electrode 30 and the first dummy electrode 31a of the first detection electrode layer 29A are provided in a place where the protruding part 25, or the protruding part 25 and the connecting portion 29 are not provided. For example, both the second detection electrode 32 and the second dummy electrode 31b of the second detection electrode layer 29B are provided in a place where the protruding part 25, or the protruding part 25 and the connecting portion 29 are not provided. In this case, the metal wire 35 is provided on the surface 24a and the back surface 24b of the base material 24.

Manufacturing Method for Conductive Film

The conductive film can be produced, for example, by the following step 1 and step 2.

Step 1

Figure 9:
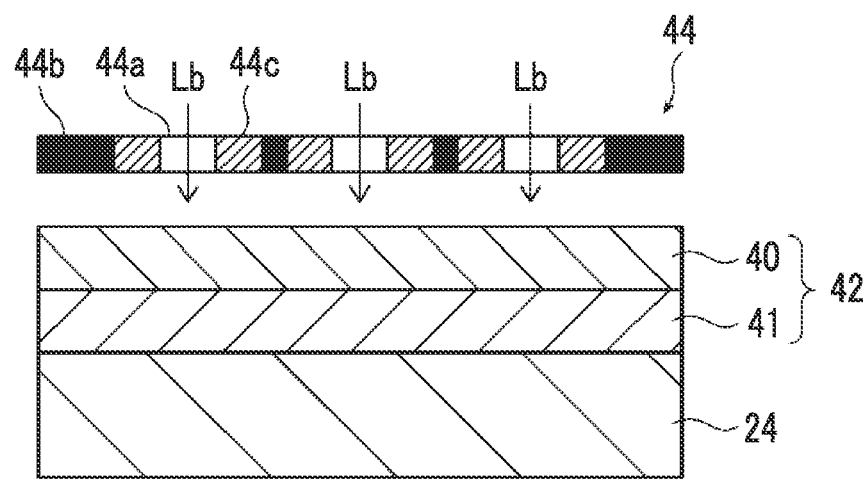
FIG. 9 is a schematic cross-sectional view illustrating one step of a first example of a manufacturing method for a protruding part of the conductive film according to the embodiment of the present invention.
Figure 10:
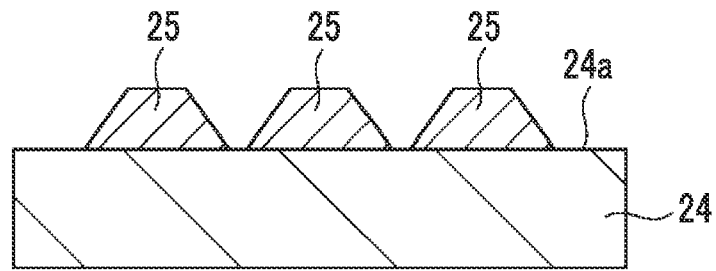
FIG. 10 is a schematic cross-sectional view illustrating one step of a first example of a manufacturing method for a protruding part of the conductive film according to the embodiment of the present invention.

FIG. 9 and FIG. 10 are schematic cross-sectional views illustrating, in order of steps, a first example of a manufacturing method for a protruding part of the conductive film according to the embodiment of the present invention. In FIG. 9 and FIG. 10, the same reference numerals are assigned to the same configuration components as those in FIG. 4, and the detailed description thereof will be omitted.

The step 1 includes, as illustrated in FIG. 9, a laminating step of closely attaching a dry film resist 42, which has a support film 40 and an adhesive photosensitive resin layer 41 laminated on the support film 40, to the base material 24 and carrying out lamination, an exposure step of irradiating a predetermined portion of the photosensitive resin layer 41 on the base material 24 with an actinic ray Lb, and a development step of developing the exposed photosensitive resin layer 41 to form a protruding part.

In the laminating step, for example, in a case where the dry film resist 42 has a protective film (not illustrated in the drawing), a method in which the protective film is removed, and then the photosensitive resin layer 41 side is subjected to pressure bonding onto the base material 24 while being heated and lamination is carried out is used. It is noted that the laminating step is preferably carried out under reduced pressure from the viewpoint of the adhesiveness of the dry film resist 42 and the followability.

Examples of the exposure method in the exposure step include an exposure method using a mask 44 as illustrated in FIG. 9. A known light source can be used as a light source of the actinic ray Lb. The known light source is a light source that effectively emits ultraviolet rays or visible light, such as a carbon arc lamp, a mercury vapor arc lamp, an ultra-high pressure mercury lamp, a high pressure mercury lamp, or a xenon lamp. In addition, as the light source of the actinic ray Lb, a light source that effectively emits ultraviolet rays, visible light, or the like, such as an Ar ion laser or a semiconductor laser, can be used. Further, as the light source of the actinic ray Lb, a light source that effectively emits visible light, such as a floodlight bulb for photography or a solar lamp can also be used.

As illustrated in FIG. 9, the mask 44 includes a plurality of light transmitting parts 44a that have been subjected to die cutting to match with the protruding parts 25, respectively, a light shielding unit 44b that covers a portion which does not form the protruding parts 25 described above, and a gradation part 44c that covers a portion matching with the side surface having a gradient and gradually changes the exposure amount.

The mask 44 described above is used to control the exposure amount for each portion in the photosensitive resin layer 41 in an uncured state. That is, the photosensitive resin layer 41 of a portion covered by the light transmitting part 44a of the mask 44 is cured, and the photosensitive resin layer 41 of a portion covered by the light shielding unit 44b of the mask 44 is left uncured. Then, the photosensitive resin layer 41 of a portion covered by the gradation part 44c is semi-cured so that the degree of curing gradually decreases as the distance from the light transmitting part 44a increases.

In addition, a method of applying the actinic ray Lb in the same manner as in the exposure method for the mask 44, by a direct drawing method using a laser exposure method or the like, may be adopted.

In a case where the support film 40 is transparent with respect to the actinic ray Lb, the actinic ray Lb can be applied through the support film 40.

In addition, in a case where the base material 24 is transparent with respect to the actinic ray Lb, the photosensitive resin layer 41 can be irradiated with the actinic ray Lb from the base material 24 side through the base material 24.

However, from the viewpoint of resolution, it is preferable to apply the actinic ray Lb from the photosensitive resin layer 41 side.

In the development step, the photosensitive resin layer 41 is removed in inverse proportion to the exposure amount. Specifically, in a case where the transparent support film 40 is present on the photosensitive resin layer 41, the support film 40 is first removed, and then the photosensitive resin layer 41 is removed by wet development in inverse proportion to the exposure amount. As a result, the cured portion of the photosensitive resin layer 41 of the portion covered by the light transmitting part 44a of the mask 44 remains as it is, and the protruding part 25 is formed on the surface 24a of the base material 24 as illustrated in FIG. 10. In addition, all the uncured portions covered by the light shielding unit 44b of the mask 44 are removed, and the protruding parts 25 is not formed.

The semi-cured portion covered by the gradation part 44c remains depending on the degree of curing, and a side surface of the protruding part 25, which has a gradient, is formed. It is noted that the semi-cured portion is deformed to be broken at the time of development, whereby the change in the horizontal direction is converted to a change in the vertical (thickness) direction.

Wet development is carried out, for example, by a known method such as spraying, rocking immersion, brushing, or scraping, by using a developer matching with a photosensitive resin, such as an alkaline aqueous solution, an aqueous developer, or an organic solvent developer.

As the developer, a developer which is safe and stable and has good operability, such as an alkaline aqueous solution, is used. For example, the following base is used as a base of the alkaline aqueous solution: an alkali hydroxide such as a hydroxide of lithium, sodium, or potassium; an alkali carbonate such as a carbonate or bicarbonate of lithium, sodium, potassium, or ammonium; an alkali metal phosphate such as potassium phosphate or sodium phosphate; and an alkali metal pyrophosphate such as sodium pyrophosphate or potassium pyrophosphate. In addition, an aqueous developer consisting of water or an alkaline aqueous solution and one or more kinds of organic solvents can be used. Further, two or more kinds of the above-described developers may be used in combination, as necessary.

Examples of the developing method include a dipping method, a puddling method, a spraying method, brushing, and slapping. Among these, it is preferable to use a high-pressure spraying method from the viewpoint of improving the resolution.

After the development, as necessary, the protruding part 25 may be further cured by carrying out exposure.

It is noted that, in a case of changing the configuration of the mask 44, it is possible to form such one as illustrated in FIG. 7, which has a configuration in which the connecting portion 29 is provided in the space 27 between the protruding parts 25.

Step 2

The step 2 is a step of forming the metal wire 35 extending across the plurality of protruding parts 25, on the base material 24 having the surface 24a on which the protruding parts 25 are formed, as illustrated in FIG. 10.

Examples of the method of forming a copper wire as the metal wire 35, on the base material 24 having the surface 24a on which the protruding parts 25 are formed, include a method having a step of forming a copper foil layer on the base material 24 on which the protruding parts 25 are formed on the surface 24a, and a step of forming a patterned copper wire from the formed copper foil layer according to a photolithography method.

Examples of the method of forming a copper foil layer include known methods. Examples thereof include methods using a wet process, such as a coating method, an inkjet method, a coating method, and a dipping method, and methods using a dry process, such as a vapor deposition method (a resistance heating method, an electron beam (EB) method, or the like), a sputtering method, and a chemical vapor deposition (CVD) method. Among the film forming methods described above, a sputtering method is preferably applied.

In a case of subjecting the copper foil layer to etching processing according to a photolithography method, it is possible to form a copper wire which is formed of a thin copper wire and has a desired pattern, a peripheral wire.

The photolithography method is a method of processing a copper foil layer into a desired pattern, for example, by subjecting the copper foil layer to each of steps of resist coating, exposure, development, rinsing, etching, and resist peeling.

A known photolithography method can be appropriately used for the formation of the copper wire. For example, any one of a positive-tone resist or a negative-tone resist can be used as a resist. In addition, after the resist is applied, preheating or prebaking can be carried out as necessary. At the time of exposure, it suffices that a pattern mask having a desired pattern is disposed and light (for example, ultraviolet rays) having a wavelength suitable for the resist used is applied through the pattern mask. After the exposure, development can be carried out with a developer suitable for the resist used. After the development, the development is stopped with a rinsing liquid such as water, and washing is carried out, whereby a resist pattern is formed.

Next, the formed resist pattern can be subjected to pretreatment or post-baking, as necessary, and then engraved with etching. As an etchant, a known copper etchant such as an aqueous solution of iron (III) chloride can be used, for example, in a case where the copper foil layer contains copper.

After etching, the residual resist is peeled off to obtain a copper wire having a desired pattern. As described above, the photolithography method applied to the present manufacturing method is a method generally recognized by those skilled in the art, and thus a specific application aspect thereof can be easily selected by those skilled in the art according to an intended purpose.

The method of forming the protruding part 25 on the base material 24 is not particularly limited to the above-described step 1.

For example, recessed parts of a recessed plate roll are filled with an ink consisting of a photosensitive resin and a solvent, the ink is transferred to be spaced apart onto a base material, and then a solvent is evaporated to carry out drying, whereby a film in which protruding parts in an uncured state are disposed to be spaced apart is formed. Next, the film in an uncured state is irradiated with an actinic ray to be cured, whereby the protruding part 25 (see FIG. 10) is formed.

In a case where the connecting portion 29 is provided, the distance between the recessed plate roll and the base material 24 is adjusted, the ink is transferred onto the base material, and then the solvent is evaporated and drying is carried out to form an unevenly shaped film in an uncured state. Next, the unevenly shaped film in an uncured state is irradiated with an actinic ray to be cured, whereby the protruding part 25 (see FIG. 7) and the connecting portion 29 (see FIG. 7) are formed.

Further, they can also be formed by using a shaping mold in a case where the connecting portion 29 is provided. First, the above-described photosensitive resin layer is formed on the base material 24, and then the shaping mold is pressed against the photosensitive resin layer to deform the photosensitive resin layer, whereby an unevenly shaped film in an uncured state is formed. Next, the unevenly shaped film in an uncured state is irradiated with an actinic ray to be cured, whereby the protruding part 25 (see FIG. 7) and the connecting portion 29 (see FIG. 7) are formed.

Hereinafter, each part of the conductive film and the touch panel will be described.

Base Material

The base material supports the metal wire, and it supports the first detection electrode and the second detection electrode composed of the metal wire. In addition, the base material supports the first peripheral wire and the second peripheral wire. In addition, in a case where the first detection electrode is disposed on one surface of both surfaces of the base material and the second detection electrode is disposed on the other surface thereof, the base material electrically insulates the first detection electrode and the second detection electrode from each other. For the base material, for example, a transparent insulating substrate is used. Examples of the material of the base material include a transparent resin material and a transparent inorganic material. The base material preferably has a thickness of 20 to 50 µm.

The base material is preferably a polyethylene terephthalate (PET) film from the viewpoint of cost. In a case where heat resistance is required, a polyethylene naphthalate (PEN) film or a polyimide-based film can be used. In addition to this, it is possible to use, as a base material, a film having a thickness in a range of 20 to 50 µm, which is manufactured from a polyethylene resin, a polypropylene-based resin, a methacrylic resin, a cyclic polyolefin-based resin, a polystyrene-based resin, an acrylonitrile-(poly)styrene copolymer (an AS resin), an acrylonitrile-butadiene-styrene copolymer (an ABS resin), a polyvinyl chloride-based resin, a poly(meth)acrylic resin, a polycarbonate-based resin, a polyester-based resin, a polyamide-based resin, a polyamideimide-based resin, or the like.

The total light transmittance of the base material is preferably 40% to 100% and more preferably 85% to 100%. The total light transmittance is measured, for example, using "Plastics—Determination of total luminous transmittance and reflectance" specified in Japanese Industrial Standards (JIS) K 7375: 2008.

Protruding Part and Connecting Portion

The material constituting the protruding part 25 and the connecting portion 29 is a photosensitive resin having electrical insulating properties. It is possible to use a resin that is obtained by imparting photocuring properties to a heat-sensitive adhesive or pressure-sensitive adhesive resin. Examples of the material constituting the protruding part 25 and the connecting portion 29 include an acrylic resin, a styrene resin, an epoxy resin, an amide resin, an amide epoxy resin, an alkyd resin, a phenol resin, an ester resin, a urethane resin, an epoxy acrylate resin obtained by a reaction between an epoxy resin and (meth)acrylic acid, and an acid-modified epoxy acrylate resin obtained by a reaction between an epoxy acrylate resin and an acid anhydride.

Metal Wire

As described above, the metal wire 35 is a metal wire that constitutes the first detection electrode 30 (see FIG. 2), the first peripheral wire 23a (see FIG. 2), the second detection electrode 32 (see FIG. 2), and the second peripheral wire 23b (see FIG. 2). A method of forming the metal wire 35 will be described later.

Examples of the metal contained in the metal wire 35 include a metal such as gold (Au), silver (Ag), copper (Cu), and aluminum (Al), and an alloy. Among them, from the viewpoint of the excellent conductivity of the metal wire, the metal contained in the metal wire 35 is preferably silver or copper and more preferably copper or a copper alloy. In addition, the metal wire 35 is not limited to being composed of a metal simple body and may have a multilayer structure of only metals, which does not include a layer of an oxide or the like.

In a case where the metal layer is composed of copper, examples of the material thereof include a copper simple body (metallic copper) and a mixture (a copper alloy) containing copper and a metal other than copper, where a copper simple body is preferable. Examples of the metal other than copper contained in the copper alloy include silver, gold, aluminum, nickel, molybdenum, chromium, and palladium.

In addition, the thin copper wire may contain a combination of copper or a copper alloy and a polymeric binder such as gelatin or an acrylic styrene-based latex.

As described above, the thickness td of the metal wire is preferably 200 to 800 nm.

From the viewpoint of being difficult to be visible, the line width of the metal wire is preferably 10 µm or less and more preferably 5.0 µm or less. The lower limit thereof is not particularly limited; however, it is preferably 0.1 µm or more and more preferably 0.3 µm or more from the viewpoint that the conductivity of the conductive film is more excellent.

Regarding the peripheral wire as well, a configuration similar to that of the above-described metal wire can be mentioned as a preferred form.

It is noted that the line width of the metal wire is measured according to the following method.

Using a scanning electron microscope, the surface of the conductive film is observed, and one projecting metal wire is selected. In the one selected metal wire, any ten positions corresponding to the line width of the metal wire are selected. The lengths of the selected positions are measured, and the average value of the lengths of the ten positions is denoted as the line width of the metal wire.

In a case where the metal wire is composed of copper, a copper layer is formed on the base material, for example, according to a vapor deposition method or the like.

A conventional photolithography method is used for the patterning of the copper foil.

First, a resist is applied onto a copper foil, and proximity exposure is carried out using a photo mask equipped with a stripe pattern constituting a mesh part, and a lead-out electrode pattern. Development is carried out to form a resist pattern, and the copper foil exposed to the opening portion is removed by etching, with a ferric chloride solution at about 60° C., to form a copper wiring pattern.

In a case where a copper wiring pattern of a stripe pattern having the same pitch is formed in a direction orthogonal to the copper wiring pattern of the stripe pattern, it is necessary to form an insulating layer on the copper wiring pattern formed first so that the overlapping upper and lower copper wires do not short-circuit at the intersection part. In this case, a resist pattern for insulation may be formed again after peeling off the resist remaining on the copper wire used in the photolithography method for the initial copper wiring pattern, or the resist remaining on the copper wire can be used again for the insulating layer.

In a case forming the copper wiring patterns to be overlapped in the vertical direction, the countermeasure is slightly different between the negative-tone resist and the positive-tone resist pattern; however, the goal is denoted as to deform the remaining resist so that it coats the side surface of the etching-formed copper wire and is denoted as trailed. This is because there is a risk of short-circuiting or disconnection with the subsequent copper wire unless such a form is adopted. The thickness of the copper wire is preferably 2.0 µm or less. This is because in a case where the thickness is denoted as too thick, the side surface may not be coated even in a case where the resist softens and flows.

With regard to the positive-tone resist, in a case where the resist is heated to a temperature equal to or higher than the melting point, it fluidizes and drops, whereby a desired form is obtained, and at the same time, the photoreactivity disappears. Re-exposure and development may be carried out before heating to remove the resist present in a part other than the intersection part, and then the heating treatment may be carried out, whereby an unnecessary resist does not remain on the wiring line.

In a case where a negative-tone resist is used as the resist, the negative-tone resist may be cured to have a high melting point. Therefore, it is conceivable to form the initial copper wire in an insufficiently cured state. Alternatively, it is preferable that the surface of the resist on the copper foil is preferentially cured by adding an ultraviolet absorbent or the like so that a side etch is introduced toward the base. Although a mushroom-shaped resist pattern is formed, the resist is shaped like an eave after the etching of the copper foil, and thus the side surface can be coated without raising the temperature too much.

After forming the intersection part to have such a form, a copper wiring pattern in the orthogonal direction is formed by the photolithography method. A method of forming the second copper foil is not particularly specified; however, it is preferably a vapor deposition method. In addition, etching can be carried out on both the front surface and the back surface of the base material at the same time, which is a desirable processing method.

In a case of forming the metal wires on both surfaces of the base material, the above-described processing can be carried out separately or simultaneously on the front surface and the back surface of the base material since the wiring patterns do not overlap with each other.

Mesh Pattern

The first detection electrode 30 and the second detection electrode 32 are composed of the metal wire 35 as described above. A mesh pattern, which is formed by a plurality of the metal wires 35 intersecting with each other as illustrated in FIG. 3, is composed of, for example, the first detection electrode 30 and the second detection electrode 32.

In the first detection electrode and the second detection electrode, the mesh pattern composed of the metal wire 35 has an opening ratio of preferably 90% or more and more preferably 95% or more, from the viewpoint of visible light transmittance. The opening ratio corresponds to a transmissive portion excluding the metal wire in the region where the conductive layer is provided, that is, a proportion of the opening portion to the entire region where the conductive layer is provided.

It is noted that the first peripheral wire 23a and the second peripheral wire 23b may have a mesh pattern which is formed by a plurality of the metal wires 35 intersecting with each other.

In a case where the first detection electrode 30 and the second detection electrode 32, as well as the first peripheral wire 23a and the second peripheral wire 23b, have a configuration having a mesh pattern, the pattern of the mesh pattern is not particularly limited and is preferably a geometric shape that is obtained by combining a triangle such as a regular triangle, an isosceles triangle, or a right triangle, a quadrangle such as a square, a rectangle, a rhombus, a parallelogram, or a trapezoid, a (regular) n-polygon such as a (regular) hexagon or a (regular) octagon, a circle, an ellipse, a star shape, and the like.

The mesh of the mesh pattern is intended to be a shape including a plurality of opening portions 36 composed of the intersecting metal wires 35. The opening portion 36 is an opening region surrounded by the metal wire 35. In FIG. 3, the opening portion 36 has a rhombus shape; however, it may have another shape. For example, the shape may be a polygonal shape (for example, a triangle, a quadrangle, a hexagon, or a random polygonal shape). Further, the shape of one side may be a curved shape or may be a circular arc shape in addition to a straight line shape. In the case of the circular arc shape, for example, two sides facing each other may have a circular arc shape protruding outward, and the other two sides facing each other may have a circular arc shape protruding inward. Further, the shape of each of the sides may be a wavy line shape in which a circular arc protruding outward and a circular arc protruding inward are continuous. Needless to say, the shape of each of the sides may be a sine curve. The mesh pattern is not particularly limited, and it may be a random pattern or a regular pattern or may be a regular mesh pattern in which a plurality of congruent shapes are repeatedly disposed.

The mesh pattern is preferably a regular mesh pattern having the same rhombic lattice. The length of one side of the rhombus, that is, the length W of one side of the opening portion 36 (see FIG. 3) is preferably 50 to 1,500 µm, more preferably 150 to 800 µm, and still more preferably 200 to 600 µm, from the viewpoint of visibility. In a case where the length W of one side of the opening portion 36 is within the above-described range, good transparency can be also further maintained, and a display can be visible without a sense of discomfort, in a case where the conductive film 12 (see FIG. 1) is attached on the display surface 14a (see FIG. 1) of the image display unit 14 (see FIG. 1).

It is noted that the mesh pattern of the metal wire can be observed and measured using an optical microscope (Digital Microscope VHX-7000, manufactured by KEYENCE CORPORATION).

Use Application of Conductive Film

The conductive film can be applied to various use applications, and for example, it can be applied to the manufacture of a touch panel (or a touch panel sensor), a semiconductor chip, various electrical wiring plates, flexible printed circuits (FPC), a chip on film (COF), tape automated bonding (TAB), an antenna, a multilayer interconnection board, a motherboard. Among these, the conductive film is preferably used in the manufacture of a touch panel (a capacitance-type touch panel).

In addition to the metal wire, the conductive film may further have a conductive portion having a configuration different from that of the metal wire. This conductive portion may be electrically connected to the above-described metal wire to be conductively connected. Examples of the conductive portion include an alignment mark for adjusting positions of a conductive film and a member to be laminated.

Examples of the use application of the conductive film other than those described above include an electromagnetic wave shield that blocks electromagnetic waves such as radio waves and microwaves (ultra-high frequency radio waves), generated from electronic apparatuses such as a personal computer and a workstation and prevents static electricity. Such an electromagnetic wave shield can be used not only for the main body of the personal computer but also for an electronic apparatus such as a videographing apparatus or an electronic medical apparatus.

The conductive film can also be used for a transparent exothermic body.

The conductive film may be used in the form of a laminate having a conductive film and other members such as a pressure-sensitive adhesive sheet and a peeling sheet during handling and transportation. The peeling sheet functions as a protective sheet for preventing the occurrence of scratching on the conductive member during transportation of the laminate. Further, the conductive film may be handled in the form of a composite body having, for example, a conductive film, a pressure-sensitive adhesive sheet, and a protective layer in this order.

The present invention is basically constituted as described above. As described above, the conductive film, the touch sensor film, and the image display apparatus, according to the embodiments of the present invention, have been described in detail; however, the present invention is not limited to the above-described embodiments, and, needless to say, various improvements or modifications may be made without departing from the gist of the present invention.

EXAMPLES

Hereinafter, the characteristics of the present invention will be described more specifically with reference to Examples. The materials, the reagents, the amounts and ratios of substances, the operations, and the like described in the following Examples can be appropriately modified as long as they do not depart from the gist of the present invention. As a result, the scope of the present invention is not limited to the following Examples.

In present Example, conductive films of Examples 1 to 6 and Comparative Examples 1 to 5 were produced, and the bending resistance was evaluated.

Example 1

As a resin base material, a polyethylene terephthalate (PET) film (manufactured by TOYOBO Co., Ltd., COSMOSHINE (registered trade name) A4300) having a thickness of 50 μm was prepared. Using the resin base material, a conductive film was produced according to the following step 1 and step 2.

Step 1

The following steps are included: a lamination step of laminating a dry film resist, which includes a support film and an adhesive photosensitive resin layer laminated on the support film, to be closely attached to a resin base material; an exposure step of irradiating a predetermined portion of the photosensitive resin layer on the resin base material with an actinic ray; and a development step of developing the exposed photosensitive resin layer to form a protruding part.

In the laminating step, in a case where the dry film resist had a protective film, the protective film was removed, and then the photosensitive resin layer side was subjected to pressure bonding onto the resin base material, while being heated under reduced pressure, to laminate the photosensitive resin layer.

In the exposure step, an exposure method using a mask was used. A high pressure mercury lamp was used as a light source for the actinic rays.

The mask used in the exposure includes a plurality of light transmitting parts subjected to die cutting to match with the protruding parts, respectively, a light shielding unit that covers a portion which does not form the protruding parts described above, and a gradation part that covers a portion matching with the side surface having a gradient and gradually changes the exposure amount. The photosensitive resin layer of a portion covered by the light transmitting part of the mask is cured, and the photosensitive resin layer of a portion covered by the light shielding unit of the mask is left uncured. Then, the photosensitive resin layer of a portion covered by the gradation part was semi-cured so that the degree of curing gradually decreases as the distance from the light transmitting part increases.

In the development step, the cured portion of the photosensitive resin layer remains as it is, and a protruding part is formed on the surface of the resin base material. In addition, all the uncured portions of the photosensitive resin layer are removed, and the protruding part is not formed. The semi-cured portion remains depending on the degree of curing, and the side surface of the protruding part, which has a gradient, is formed.

In the development step, wet development was carried out, and an alkaline aqueous solution was used as a developer.

Step 2

Using copper as a target, one surface of the base material having a surface on which the protruding part was formed was subjected to sputtering film formation, while introducing argon gas (flow rate: $4.563 \times 10^{-1}$ Pa·m³/sec (270 standard cubic centimeter per minute (sccm)) into a sputtering apparatus, under the conditions of a film forming chamber pressure of 0.4 Pa, a power density of 4.2 W/cm², and a roll temperature during film formation of 90° C., whereby a copper film was formed. The thickness of the copper film was 400 nm.

After forming the copper film, a rust prevention treatment was carried out on the copper film, and the copper film was patterned by a photolithography method. More specifically, a positive-tone resist was applied onto the copper film to form a resist film having a thickness of 2 μm. Next, the resist film was irradiated with a metal halide lamp in a state where a glass photo mask was disposed on the resist film, and then the laminate on which the resist film was disposed was immersed in an aqueous sodium hydroxide solution having a concentration of 3% to carry out development, whereby a resist film having a comb-shaped pattern was obtained.

With this resist film as a mask, the copper film was etched using an aqueous solution of iron (III) chloride having a concentration of 5% to form a comb-shaped pattern in which the line width is 10 μm, the space width is 20 μm, and thirty lines (thin copper wires) are provided. Finally, the remaining resist film was peeled off to obtain a conductive film having a comb-shaped patterned copper wire composed of thin copper wires having a thickness of 400 nm. The thickness of the thin copper wire corresponds to the thickness td of the metal wire.

Examples 2 to 6 and Comparative Examples 1 to 5

Conductive films of Examples 2 to 6 and Comparative Examples 1 to 5 were produced according to the procedure of Example 1, except that the size of the mask, the development conditions, or the formation conditions of the copper foil layer were adjusted so that the width Lj of the protruding part, the interval Ld between the protruding parts, the thickness tj of the protruding part, and the thickness td of the metal wire were as shown in Table 1 described later.

conductive connectivity (conductivity) of the conductive film was evaluated according to the following evaluation standards, and this was used for the evaluation of the bending resistance. In a case where the evaluation was 3 or 4, it was determined to be a pass level.

4: 25 or more wires of the thin copper wire were conductively connected.

3: 15 or more and 24 or fewer wires of the thin copper wire were conductively connected.

2: 5 or more and 14 or fewer wires of thin copper wire were conductively connected.

1: 1 or more and 4 or fewer wires of the thin copper wire were conductively connected, or all the thin copper wires were not conductively connected.

TABLE 1

|  | tj (nm) | td (nm) | tj ≥ td | tj ≥ 2td | Lj (μm) | Ld (μm) | Bending resistance |
|---|---|---|---|---|---|---|---|
| Example 1 | 1000 | 400 | 1000 > 400 | 1000 > 2 × 400 | 10 | 2 | 4 |
| Example 2 | 400 | 400 | 400 = 400 | 400 < 2 × 400 | 10 | 2 | 3 |
| Example 3 | 1000 | 1000 | 1000 = 1000 | 1000 < 2 × 1000 | 10 | 2 | 3 |
| Example 4 | 1000 | 400 | 1000 > 400 | 1000 > 2 × 400 | 20 | 10 | 4 |
| Example 5 | 1000 | 400 | 1000 > 400 | 1000 > 2 × 400 | 80 | 10 | 3 |
| Example 6 | 1000 | 400 | 1000 > 400 | 1000 > 2 × 400 | 20 | 80 | 3 |
| Comparative Example 1 | 200 | 400 | 200 < 400 | 200 < 2 × 400 | 10 | 2 | 2 |
| Comparative Example 2 | 1000 | 1200 | 1000 < 1200 | 1000 < 2 × 1200 | 10 | 2 | 1 |
| Comparative Example 3 | 1000 | 400 | 1000 > 400 | 1000 > 2 × 400 | 100 | 10 | 2 |
| Comparative Example 4 | 1000 | 400 | 1000 > 400 | 1000 > 2 × 400 | 20 | 0.5 | 2 |
| Comparative Example 5 | 1000 | 400 | 1000 > 400 | 1000 > 2 × 400 | 20 | 100 | 1 |

Evaluation of Bending Resistance
Bending Test

The produced conductive film was subjected to a bending test using a cylindrical mandrel by a method in accordance with the bending resistance test according to the cylindrical mandrel method described in Japanese Industrial Standards (JIS)-K-5600-5-1 (1999). More specifically, using a roller, the produced conductive film was bent to be wound around a cylindrical mandrel having a diameter of 1 mm. At the time when the conductive film was bent, the conductive film was disposed so that the base material and the copper wire were disposed in this order from the cylindrical mandrel and the direction in which the copper wire extended was the direction along the circumferential direction of the cylindrical mandrel.

In the bending test, treatment was carried out 100 times, where one time of treatment was defined as a process of bending the conductive film and then returning the bent conductive film to a flat shape. In addition, the conductive film was bent manually.

Conductive Connection Test

After the bending test, it was checked, regarding the 30 wires of the thin copper wire constituting the copper wire, whether or not each thin copper wire was conductively connected electrically. Specifically, terminals of a tester (Digital Multimeter 34410A manufactured by Agilent Technologies, Inc.) were brought into contact with both ends of each thin copper wire to measure the resistance value of the thin copper wire, and then a case where OL (not measurable) was not displayed was evaluated to be conductively connected electrically.

From the results of the conductive connectivity test carried out regarding 30 wires of the thin copper wire, the As shown in Table 1, Examples 1 to 6 were excellent in bending resistance as compared with Comparative Examples 1 to 5.

In Comparative Examples 1 and 2, tj≥td was not satisfied, and the bending resistance was poor.

In Comparative Example 3, the width Lj of the protruding part was long, and the bending resistance was poor. Comparative Example 3 corresponds to JP2015-22531A.

In Comparative Example 4, the interval Ld between the protruding parts was short, and the bending resistance was poor.

In Comparative Example 5, the interval Ld between the protruding parts was long, and the bending resistance was poor.

Regarding Examples 1 to 6, Example 1 in which tj≥2td was satisfied was excellent in bending resistance among Examples 1 to 3.

In Examples 4 and 5, Example 4 in which the width Lj of the protruding part was 20 μm was excellent in bending resistance. That is, in a case where the relationship of 1 μm≤Lj≤20 μm was satisfied, the effect was more excellent.

In Examples 4 and 6, Example 4 in which the interval Ld between the protruding parts was 10 μm was excellent in bending resistance. That is, in a case where the relationship of 1 μm≤Ld≤20 μm was satisfied, the effect was more excellent.

EXPLANATION OF REFERENCES

10: image display apparatus
11: touch panel
12: conductive film

13: controller
14: image display unit
14a: display surface
14b: back surface
14c: side surface
15: first transparent insulation layer
16: cover part
16a: surface
17: second transparent insulation layer
17c: side surface
18: protective film
18c: terminal
19: flexible circuit board
20: detection unit
22: peripheral wiring part
23a: first peripheral wire
23b: second peripheral wire
24: base material
24a: surface
24b: back surface
25: protruding part
26a: first external connection terminal
26b: second external connection terminal
27: space
29: connecting portion
29A: first detection electrode layer
29B: second detection electrode layer
30: first detection electrode
31a: first dummy electrode
31b: second dummy electrode
32: second detection electrode
33: first electrode terminal
34: second electrode terminal
35: metal wire
36: opening portion
38: touch sensor film
40: support film
41: photosensitive resin layer
42: dry film resist
44: mask
44a: light transmitting part
44b: light shielding unit
44c: gradation part
Bf: bending region
Bt: bending part
$D_1$: one direction
$D_2$: orthogonal direction
$D_3$: vertical direction
Dt: lamination direction
Dw: direction
$E_1$: detection region
$E_2$: peripheral region
Lb: actinic ray
Ld: interval
Lj: width
Pj: intersection
td: thickness
tj: thickness

What is claimed is:

1. A conductive film comprising:
a base material;
protruding parts disposed on the base material, each of which projects in one direction and a plurality of which are spaced apart to be disposed in a direction orthogonal to the one direction; and
a metal wire that intersects the one direction and extends across the plurality of protruding parts,
wherein in a case where a width of the protruding part in the direction orthogonal to the one direction in which the protruding part projects is denoted as Lj, and an interval between the plurality of protruding parts is denoted as Ld, 1 µm≤Lj<100 µm and 1 µm≤Ld≤20 µm are satisfied, and
in a case where a thickness of the metal wire is denoted as td, and a thickness of the protruding part is denoted as tj, tj≥td is satisfied.

2. The conductive film according to claim 1,
wherein the thickness td of the metal wire and the thickness tj of the protruding part satisfy tj≥2td.

3. The conductive film according to claim 1,
wherein the width Lj of the protruding part in the direction orthogonal to the one direction in which the protruding part projects satisfies 1 µm≤Lj≤20 µm.

4. A touch sensor film comprising:
the conductive film according to claim 1.

5. An image display apparatus comprising:
the conductive film according to claim 1.

6. The conductive film according to claim 2,
wherein the width Lj of the protruding part in the direction orthogonal to the one direction in which the protruding part projects satisfies 1 µm≤Lj≤20 µm.

7. A touch sensor film comprising:
the conductive film according to claim 2.

8. A touch sensor film comprising:
the conductive film according to claim 3.

9. A touch sensor film comprising:
the conductive film according to claim 6.

10. An image display apparatus comprising:
the conductive film according to claim 2.

11. An image display apparatus comprising:
the conductive film according to claim 3.

12. An image display apparatus comprising:
the conductive film according to claim 6.

* * * * *